(12) United States Patent
Trice et al.

(10) Patent No.: US 6,796,051 B2
(45) Date of Patent: Sep. 28, 2004

(54) DRILL MARKER TOOL

(76) Inventors: William Kent Trice, 800 E. Ash La., #923, Euless, TX (US) 76039; Gerald Lee Brannon, 800 E. Ash La., #923, Euless, TX (US) 76039

(*) Notice: Subject to any disclaimer, the term of this patent is extended or adjusted under 35 U.S.C. 154(b) by 0 days.

(21) Appl. No.: 10/294,135

(22) Filed: Nov. 14, 2002

(65) Prior Publication Data
US 2004/0093752 A1 May 20, 2004

(51) Int. Cl.[7] .............................................. B25H 7/00
(52) U.S. Cl. ................................................ 33/669; 33/562
(58) Field of Search ..................... 33/1 G, 1 K, 562, 33/563, 574, 666, 669, 670, 671, 676, 677, 678, 679

(56) References Cited

U.S. PATENT DOCUMENTS

| | | | | |
|---|---|---|---|---|
| 1,295,785 A | * | 2/1919 | Monacelli ..................... | 33/676 |
| 1,378,287 A | * | 5/1921 | Shaylor ......................... | 33/676 |
| 2,612,222 A | * | 9/1952 | Sterba et al. .................. | 33/670 |
| 2,795,052 A | * | 6/1957 | Felenchak ..................... | 33/676 |
| 2,949,798 A | * | 8/1960 | Berta, Jr. ...................... | 33/563 |
| 4,593,804 A | * | 6/1986 | Kinsey et al. ................. | 33/562 |
| 5,669,153 A | * | 9/1997 | Hood ............................ | 33/669 |
| 5,848,478 A | * | 12/1998 | Duncan ........................ | 33/562 |
| 6,643,945 B1 | * | 11/2003 | Starks .......................... | 33/562 |

* cited by examiner

*Primary Examiner*—G. Bradley Bennett
(74) *Attorney, Agent, or Firm*—Crutsinger & Booth, LLC

(57) ABSTRACT

A marker tool and method for use in duplicating a hole pattern from a primary structure into a work piece using a thin generally cylindrical main body member of elastomeric material having two ends, an adhesive coated flange terminating one of the two ends, and a marker element of a strong, hard material centrally embedded in the tool and extending between each of the two ends of the tool, the marker element being of such shape, strength and hardness as to provide an indentation in the work piece to which the tool has been adhered by the adhesive layer when the tool is struck by a hammer, for example.

20 Claims, 1 Drawing Sheet

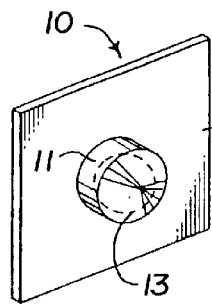
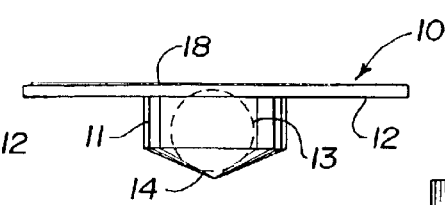
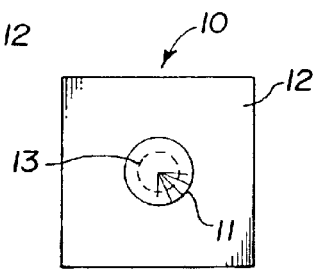
Fig. 1
Fig. 2
Fig. 3
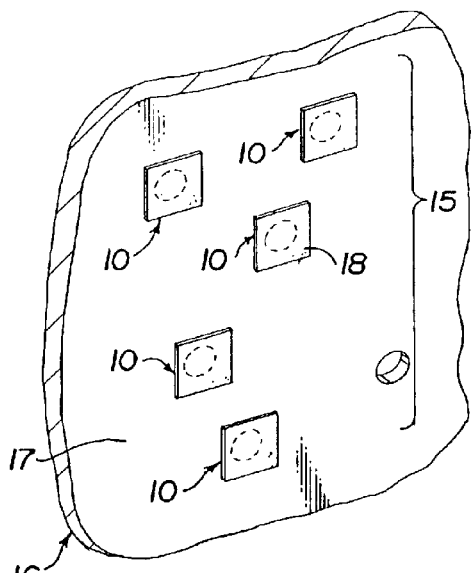
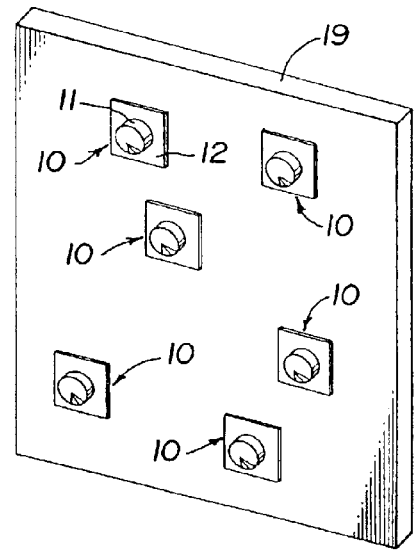
Fig. 4
Fig. 5
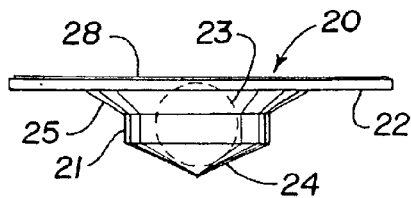
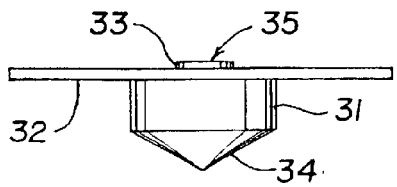
Fig. 6
Fig. 7

DRILL MARKER TOOL

BACKGROUND OF INVENTION

The present invention relates to tools for metal working and more particularly to a tool for precisely positioning holes to be drilled in a metallic or nonmetallic work piece in a particular desired or matching pattern.

It is often desired to drill a series of holes in a work piece such as sheet metal in a pattern wherein the holes bear a precise positional relationship to others in a desired pattern or where the hole pattern matches precisely a hole pattern in another piece when the hole pattern measurements may not be known with accuracy or easily ascertained.

The need to produce such a matching hole pattern occurs in the aviation industry or other industries where there is a requirement to match in a repair piece a hole pattern existing in an angle piece, an extrusion or a fuselage skin for purposes of repair or new installation. Often one side of the repair site is almost or wholly inaccessible so that the hole pattern cannot be matched by careful measurement or "thru-hole" marking to recreate the pattern in the "patch" piece.

SUMMARY OF INVENTION

According to the present invention a tracer marker device of unique design is placed in each hole of the pattern to be matched. Each tracer marker contains a center punch module and has a small laterally extending "skirt" or flange with an adhesive on its outer side. A repair or "patch" piece to be drilled is next placed over the area to be repaired and pressed against the adhesive coated tracer markers. The "patch" piece is then pulled away with the markers adhered to it in the exact desired hole pattern. The tracer markers are then each struck a blow thereby producing center punch indentations for locating and drilling a hole pattern in the "patch" piece precisely matching the hole pattern of the element to be repaired.

BRIEF DESCRIPTION OF THE DRAWINGS

A more complete understanding of the invention may be gained from reading the following detailed description reference to the accompanying drawings wherein:

FIG. 1 is a view in perspective of a first embodiment of the tracer marker tool of the present invention;

FIG. 2 is an elevation view of the tool of FIG. 1;

FIG. 3 is a bottom plan view of the tool of FIG. 1;

FIG. 4 is a view in perspective illustrating the positioning of tracer marker tools in the first step of the process of reproducing a hole pattern;

FIG. 5 is a view in perspective illustrating the positioning of the tracer marker tools adhered to a "patch" piece to mark the hole pattern;

FIG. 6 is a view in perspective of a second embodiment of the tracer marker tool of the present invention; and FIG. 7 is a side elevation view of a third embodiment of the tracer marker tool of the present invention.

DETAILED DESCRIPTION OF THE INVENTION

Referring now to FIGS. 1 through 3 the preferred form of the marker tool 10 comprises a cylindrical main body 11 with an intergral thin top flange 12. Centrally embedded in the main body 11 is a marker element 13. The main body 11 and the flange 12 of the tool 10 are made of a pliable or semipliable moldable material such as rubber, elastomer or other elastomeric material. The marker element 13 is made of a strong hard material such as steel, for example, or other material suitable for the Purpose to be described. The marker element 13 may be of any suitable shape but a spherical shape is preferred. The lower end 14 of the cylindrical body 11 may terminate as a point as illustrated in FIGS. 1 through 3, as a flat end or other configuration. The embedded marker element 13 should extend from at or near the upper surface of flange 12 to at or near the lower surface of the main body 11.

The upper surface of flange 12 is coated with an adhesive layer 18 to provide a nonpermanent "tape like" adherence to materials contacting it.

The main body 11 of the tool 10 may be formed in various sizes (diameters) to fit the holes of a pattern to be duplicated. Because of the elastic nature of the material from which the tools are made, a single diameter tool body may be useable in holes of several different diameters within a reasonable range of sizes.

The technique of using the tracer marker tools of the present invention to duplicate in a work piece a hole pattern existent in a primary or base structure so that the work piece may be attached to the base structure is illustrated by FIGS. 4 and 5.

In FIG. 4 the bodies of several marker tools 10 have been inserted in the holes of a hole pattern 15 existent in a base or primary structure 16. The tools 10 are inserted to a depth such that flanges 12 are flush against the surface 17 of the structure 16.

With the tools 11 in place and the adhesive surfaces 18 of the flanges 12 exposed, a work piece 19 in which the hole pattern is to be duplicated is oriented and pressed against the surfaces 18 of flanges 12. The flanges 12 are thus adhered to the work piece 19. When the work piece 19 is pulled back the tools remain stuck to the surface 20 and are pulled from the holes of the pattern. The tools 10 adhere to the surface 20 of the work piece 19 in the hole pattern to be duplicated.

Thereafter the tracer marker tools 10 are each struck with sufficient force to drive the marker elements 13 of the tools 10 against the surface 12 hard enough to produce an indentation in the work piece 19 similar to center punch marks to position a drill bit for drilling.

These center punch marks are arranged in the exact hole pattern to be duplicated and hence the holes drilled with these guides will be arranged in the desired pattern.

FIG. 6 is a side elevation view of a second embodiment of the tracer marker tool of the present invention. The marker tool 20 of FIG. 6 has a generally cylindrical confifiguration of the main body 21 similar to the main body of 11 of tool 10. The main body 21, like main body 11 may terminate at its lower end 24 in a point or other suitable shape. The upper portion 25 of main body 21 is flared as shown to better seat in the holes that may be countersunk in the base hole pattern to be duplicated. The tool 20 of FIG. 6 like the tool of FIGS. 1 through 3 embodies a thin flange 22 with an adhesive layer 28 and a marker element 23 positioned within the main body 21 as in the embodiment 10 of the marker tool.

A third embodiment of the marker tool of the present invention is shown in side elevation in FIG. 7. In the embodiment 30 of the main body 31, thin flange 32 and lower end 34 of main body 31 are essentially of the same configuration as the corresponding elements of embodiment 10. However, the hard "center punch" marker element of the first two embodiments of the present invention is omitted in the embodiment 30. The adhesive layer may also be omitted. Lightly adhered to the upper surface of the flange 32 is a small marker spot 33 which may be of almost any sheet material such as paper, plastic, cloth or other fabric. The marker spot 33 is relatively small and preferably of an easily perceived color so as to serve as a locator for a center punch or drill. Spot 33 is located on the axis of the main body 31 is provided with an adhesive stronger than that adhering the spot to the flange 32.

When used, the tools 30 of the third embodiment of this invention are inserted into the base structure holes of the pattern to be copied in the same manner as would be the tools of the other embodiments. The work piece surface is then pressed against the base structure to contact of the marker spots 30. Upon removal of the work piece the marker spots 33 adhered to the work piece surface accurately marking the spots to be drilled for duplication of the hole patterns in the base structure.

Thus there has been disclosed a new tracer marker tool for duplicating an existing hole pattern. While preferred embodiments of the present invention have been shown and described, various changes and modifications still within the lawful scope of the invention may occur to those informed hereby. Thus it is intended that this invention be limited only as defined in the following claims.

For drilling a work piece a hole pattern duplicating a hole pattern in a base structure of elastomic material and having embedded therein hard metal marker element extending from adjacent the flange surface to adjacent the opposite end of the element; the upper surface of the flange being coated with an adhesive material. In use the marker tool is inserted in each of the holes of the pattern to be duplicated, the adhesive on the flange exposed. A work piece to be drilled is pressed into contact with the exposed adhesive removed drawing the marker tool with it. Thus placed, to act as a center.

What is claimed is:

1. A marker tool for use in duplicating in a work piece a hole pattern existing in a primary structure comprising: a thin generally cylindrical main body member of elastomeric material having two ends, a flange terminating one of said two ends, an adhesive layer on the surface of said flange away from said main body and a marker element of strong hard material centrally embedded in said marker tool and extending from just adjacent said one of said two ends to just adjacent the second of said two ends, said marker element being of such shape, strength and hardness as to provide an indentation in a work piece to which said tool is adhered by said adhesive layer when said tool is struck with sufficient force.

2. The marker tool of claim 1 wherein said main body is of rubber.

3. The marker tool of claim 1 wherein said main body is of an elastomer.

4. The marker tool of claim 1 wherein said marker element is spherical.

5. The marker tool of claim 1 wherein said marker element is of an elongated shape.

6. The marker tool of claim 3 wherein said marker element is of spherical shape.

7. The marker tool of claim 3 wherein said marker element is of an elongated shape.

8. The marker tool of claim 1 wherein said marker element is of metal.

9. The marker tool of claim 8 wherein said metal is steel.

10. The marker tool of claim 3 wherein said marker element is of metal.

11. The marker tool of claim 10 wherein said metal is steel.

12. The marker tool of claim 4 wherein said marker element is of metal.

13. The marker tool of claim 12 wherein said metal is steel.

14. A marker tool for use in duplicating in a work piece a hole pattern existing in a primary structure comprising: an essentially cylindrical main body of elastomeric material having two ends, a thin flange terminating one of said two ends, an adhesive layer on the surface of said flange away from said main body and an elongated metal marker element centrally embedded in said marker tool and extending from just adjacent said one of said two ends to just adjacent the second of said two ends, said marker element being of such shape, strength and hardness as to produce an indentation in a work piece to which the tool is adhered by said adhesive layer when said tool is struck with sufficient force.

15. A marker tool for use in duplicating in a work piece a hole pattern existing in a primary structure comprising:
a generally cylindrical main body of elastomeric material having two ends, a thin flange terminating one of said two ends, an adhesive layer on the surface of said flange away from said main body and a spherical steel marker element embedded in said marker tool and extending from just adjacent said one end of said two ends to just adjacent the second of said two ends.

16. A marker tool for use in duplicating in a work piece a hole pattern existing in a primary structure comprising:
a generally cylindrical main body member of elastomeric material having two ends, a thin flange terminating one of said two ends, an adherent marker spot removably adhered centrally to the outer surface of said flange and a more strongly adhesive layer on said outer surface of said marker spot.

17. A marker tool of claim 16 wherein said marker spot is of fabric.

18. The marker tool of claim 16 wherein said marker spot is of paper.

19. The method of duplicating in a work piece a hole pattern comprising a plurality of holes existing in a primary structure comprising the steps of:
    (a) inserting in each of said plurality of holes comprising said pattern in said primary structure a marker tool as defined in claim 14 with said adhesive layer exposed;
    (b) pressing said work piece against said adhesive layers of said marker tools with sufficient force to adhere said marker tools to said work piece;
    (c) drawing said work piece away from said primary structure with said marker tools adhering to said work piece in the hole pattern to be duplicated;
    (d) striking each said marker tool with sufficient force to produce a plurality of indentations in said work piece; and
    (e) drilling a plurality of holes each centered at one of said plurality of said indentations.

20. The method of duplicating in a work piece a hole pattern comprising a plurality of holes existing in a primary structure comprising the steps of:
    (a) inserting in each of said plurality of holes comprising said pattern in said primary structure a marker tool as defined in claim 16 with said adherent marker exposed;
    (b) pressing said work piece against the said adherent markers of said marker tools with sufficient pressure to cause said adherent markers to adhere to said work piece;
    (c) drawing said work piece with said adhered markers away from said primary structure; and
    (d) drilling a plurality of holes in said work piece each centered in one of said adherent markers adhered to said work piece.

* * * * *